March 3, 1959

R. B. MATTHEWS 2,875,773

FUEL CONTROL APPARATUS

Filed Sept. 17, 1953

INVENTOR.
Russell B. Matthews
BY
Seegert & Schwalbach
Att'ys

March 3, 1959

R. B. MATTHEWS 2,875,773

FUEL CONTROL APPARATUS

Filed Sept. 17, 1953

INVENTOR.
Russell B. Matthews
BY
Seegert & Schwalbach
Attys

United States Patent Office 2,875,773
Patented Mar. 3, 1959

2,875,773
FUEL CONTROL APPARATUS

Russell B. Matthews, Wauwatosa, Wis., assignor to Baso Inc., Milwaukee, Wis., a corporation of Wisconsin Application September 17, 1953, Serial No. 380,769

2 Claims. (Cl. 137—66)

This invention relates to fuel control apparatus, and more particularly to apparatus of the type which includes a control device having an electromagnetic operator for the actuation of a valve, or the like, for controlling fuel flow, for example to fluid fuel burning apparatus and responsive to changes in temperature or other condition.

The copending application for patent of Eugene E. Meusy, Serial No. 345,010, filed March 27, 1953, shows and describes an electromagnetic control device utilizing an electromagnetic valve operator and having manually resettable safety shut-off means associated with the valve controlled by said operator for closing said valve if open, and for holding the latter closed on pilot failure.

It is a principal object of the present invention to provide an improved electromagnetic control device having a valve operator which may be of the general type shown in the above referred to copending application, said device also having an electromagnetically controlled safety shut-off means which does not require resetting.

Another object of the present invention is to provide an improved control device of the character described wherein the safety shut-off means forms an integral part of a releasable force transmitting connection between the valve operator and a fuel control valve, said connection being operable to transmit forces from said operator to said valve and to effect opening of said valve during normal pilot burner operation, said safety shut-off means creating lost motion in said connection upon pilot failure thereby rendering said connection ineffective to open said valve during pilot outtage.

Another object of the invention is to provide an improved control device of the class described wherein the safety shut-off means includes a stationary electromagnet and an armature coacting with said electromagnet and attracted thereto with a predetermined force when said electromagnet is energized, the force transmitting connection also including a lever pivotally connected at spaced points to the valve and to said armature, there being a cam of novel shape actuated by the operator and engageable with said lever intermediate said pivotal connections to cause pivotal movement of the lever about said armature connection and opening of said valve on rotation of the cam when the electromagnet is energized, said cam initially engaging said lever in a manner to exert relatively high initial forces on the valve to crack the latter, after which said cam engages said lever in a manner to produce relatively rapid valve opening movement, said cam being so shaped that the forces exerted by the lever on the armature tending to pull the latter off the energized electromagnet remain substantially constant, for example, at a value slightly less than said predetermined attractive force.

Another object of the invention is to provide an improved control device of the character described having biasing means biasing the valve toward closed position and also having biasing means biasing the armature of the safety shut-off means toward the electromagnet of the latter, said valve biasing means holding the valve closed upon actuation of the lever when the armature is released, and said armature biasing means returning the armature to attracted position with respect to the electromagnet when said lever is no longer actuated, said last-mentioned biasing means eliminating the need for reset means.

Another object of the invention is to provide an improved control device wherein release of the safety shut-off means does not prevent operation of the electromagnetic valve operator, the latter being free to actuate the lever during pilot outtage, for example under the control of a thermostat. Overheating of the operator is thus prevented, and therefore no switch means is required to disconnect the operator from its power source during pilot outtage.

Another object of the invention is to provide an improved control device of the character described which when associated with a fuel burning unit provides safe lighting, since the fuel control valve cannot be opened, and hence fuel is prevented from flowing to the main burner of the unit, until after the pilot burner flame has heated the thermoelectric generator sufficiently to energize the electromagnet of the safety shut-off means. Safe lighting is further insured by the fact that in order to render the force transmitting connection operative, not only must the electromagnet be energized, but after energization of the electromagnet the thermostat must be set so that it does not call for heat. Thus, if the thermostat is turned down before lighting the pilot burner, the force transmitting connection is rendered operative upon energization of the electromagnet, but since the turned down thermostat doesn't call for heat, the valve remains closed. On the other hand, if the thermostat is not turned down before lighting the pilot burner, the valve remains closed because the released force transmitting connection is inoperative to open the valve, even though the thermostat may call for heat.

Another object of the invention is to provide an improved control device which is compact and relatively simple in construction, and which is well adapted to mass production manufacture.

Other and further objects and advantages, and numerous adaptations of the invention will appear from the following detailed description taken in connection with the accompanying drawings showing certain embodiments of the invention, it being understood that the invention is limited only within the scope of the appended claims and not to the particular embodiments selected for illustration.

Figure 1:
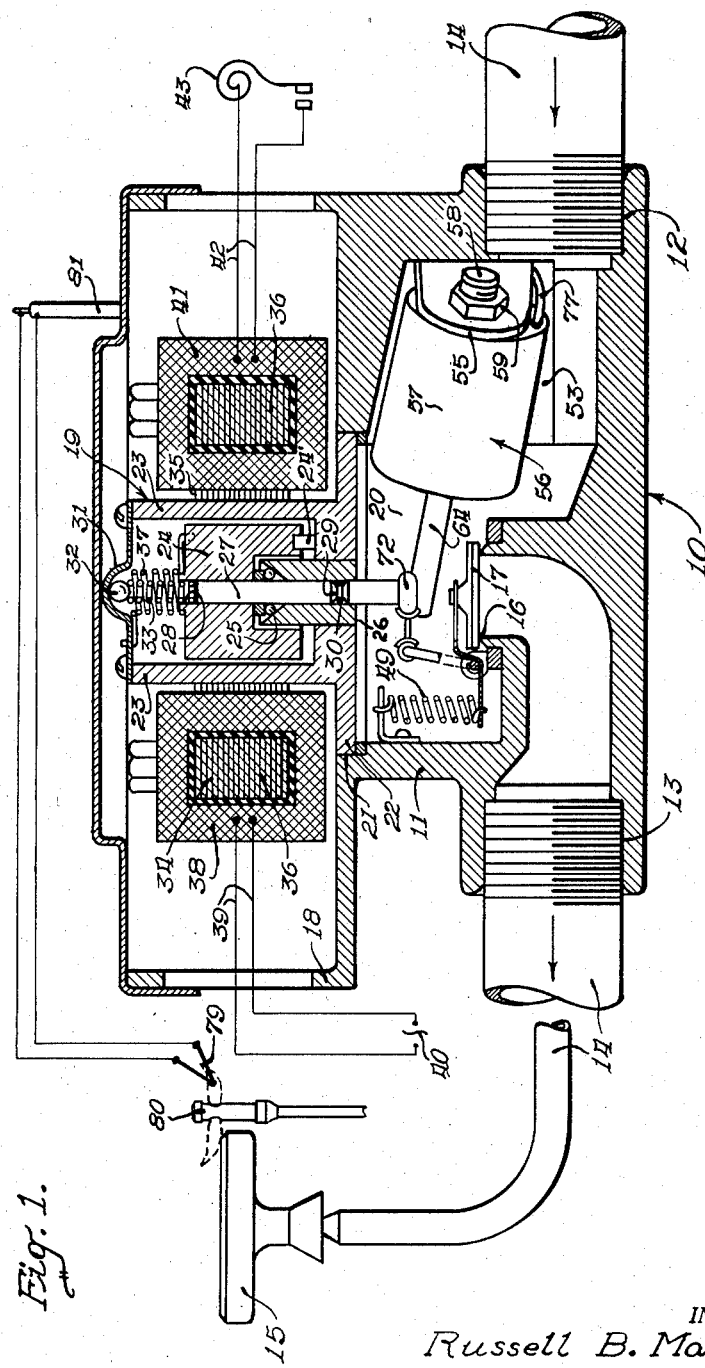
Figure 1 is a semi-diagrammatic elevational view of one form of fuel control apparatus embodying the present invention, the improved fuel control device therein being shown in axial section.

Referring to the drawings, the numeral 10 indicates the improved fuel control device which includes a valve body 11 having an inlet 12 and an outlet 13. Contiguous sections of a gaseous fuel supply pipe 14 are connected to the inlet 12 and outlet 13, the section connected to the outlet leading to a main burner 15 which may be located in the firebox of a heater or other fuel burning apparatus. The valve body 11 is provided with an annular valve seat 16 intermediate the inlet 12 and outlet 13, and a valve disc 17 cooperates with said valve seat to control the flow of fuel through the pipe 14 to the main burner 15.

The valve body 11 has a cavity 20 provided with an opening 21 covered by a cover plate 22. The valve body 11 has integral therewith an enclosure 18 for an electromagnetic valve operator indicated generally by the numeral 19. The operator 19 may take the general form shown and described in the aforementioned copending Meusy application, Serial No. 345,010, and more specifically may include the manually actuated mechanism for rotating the operator rotor on power failure, as shown and described in said application. The structure of the operator 19 will not be set forth in detail herein, reference being had to the aforementioned copending application for this purpose.

Suffice it to state for the purposes of the present application that the cover 22 is provided with a pair of upstanding ears 23 forming a partial enclosure for a rotor or armature 24. The rotor 24 is mounted for rotation on bearings 25 interposed between the bottom of the rotor and the tapered annular upper end surface of a sleeve 26 carried by and projecting through the cover plate 22. The rotor 24 is axially bored to fixedly receive a shaft which terminates short of the upper end of the rotor to provide an axial recess 28, said shaft extending axially through the sleeve 26 and projecting into the cavity 20 above the valve disc 17 as shown. The shaft 27 may be provided with a peripheral groove 29 within the sleeve 26, said groove receiving a resilient O ring 30 which provides a gas seal.

Figure 3:
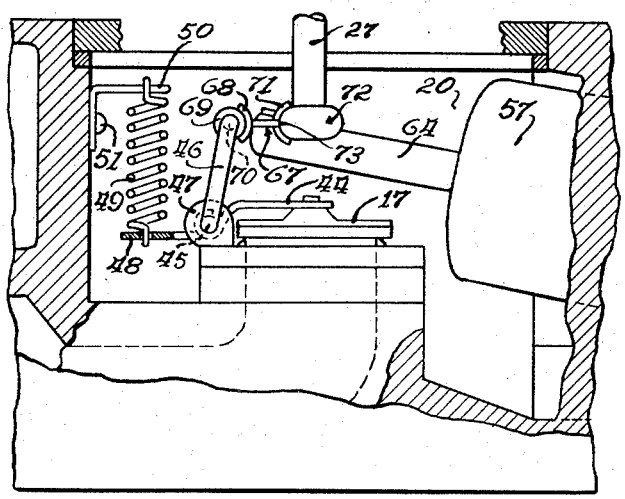
Figure 3 is an enlarged fragmental elevational view of a portion of the control device shown in Figure 1.

A bearing plate 31 is mounted on the upper ends of the arms 23 and is formed with a central upwardly offset concave-convex portion 31 to receive a ball 32. A coiled compression spring 33 has one end positioned in the armature recess 28, and has its other end in engagement with the ball 32. The ball 32 and spring 33 provide an axial thrust on the armature 24 which urges the balls of the bearing 25 against the shaft 27 as well as against the tapered end surface of the sleeve 26. A helical torsion spring 37 is positioned coaxially around the compression spring 33, having one end anchored to the plate 31 and the other end anchored to the rotor 24 as shown. The spring 37 biases the armature 24 and hence the shaft 27 in a valve closing direction, i. e., clockwise as viewed in Figure 3, there being a stop member 24' engageable by the rotor and defining the limit of its rotation in a clockwise direction.

A generally rectangular magnetic core 34 is suitably mounted within the enclosure 18 in surrounding relationship with respect to the rotor 24 and arms 23. The core 34 may have a pair of parallel side legs 35 (one of which is shown in Figure 1) and a pair of parallel end legs 36. The side legs 35 are preferably formed with pole pieces (not shown) which project toward each other and define an air gap (also not shown) in which the rotor 24 is positioned.

A primary winding 38 is wound on one end leg 36 of the core 34 and is adapted to be connected, as by conductors 39, to a suitable source of electric energy 40, which may be an alternating current source. A secondary winding 41 is wound on the other end leg 36 of the core 34 and is connected, as by conductors 42, to a condition responsive circuit controlling device 43, which may take the form of a thermostat. It will be understood that when the primary coil 38 is energized and the secondary circuit is open, the magnetic flux established in the core 34 will tend to flow through the end leg 36 within the secondary coil 41 in preference to jumping the air gap (not shown) at the rotor, whereas when the secondary circuit is closed, currents induced in the coil 41 create a field opposing primary flux flow through the end leg within the coil 41, and said flux is diverted across the air gap to cause valve opening rotation of the armature 24 and shaft 27. This rotation is counter-clockwise as viewed in Figure 2 and causes deformation of the torsion spring 37.

The valve disc 17 is carried by a bracket 44 which is fixed to the elongated arm 45 of a J-shaped member 46.

A pair of upstanding apertured ears 47 are positioned adjacent the valve seat 16 and provide a pivotal mounting for the arm 45, the bracket 44 being fixed to said arm between said ears. The bracket 44 has a tongue 48 projecting beyond the arm 45 of member 46 and connected to a coiled tension spring 49 which is anchored to a bracket 50, the latter being fixed to the wall of the cavity 20, as by a screw 51. It is apparent, therefore, that the tension spring 49 biases the valve disc 17 toward closed position with respect to the seat 16.

The valve body 11 is formed with a side opening 52 which opens into the cavity 20 and is closed by a removable side plate 53 fixed to the valve body as by screws 54. The plate 53 is provided with an integral laterally inwardly projecting slotted bracket on which is mounted an electromagnetic safety shut-off assembly 56. The assembly 56 comprises hood or casing 57 which may be provided with an anchoring stud 58 which projects through the slot in the bracket 55 and is secured thereto as by a nut 59.

An electromagnet 60, comprising a generally U-shaped magnetic frame or core 61 and windings 62 on the legs of said core, is suitably fixed within the hood 57 adjacent the end wall from which the stud 58 projects. An armature 63 is fixed to one end of a stem 64 and coacts with the electromagnet 60. The stem 64 projects through the end wall of the hood 57 opposite the electromagnet and is mounted for axial movement. A coiled compression spring 65 surrounds the stem 64, having one end in abutment with the armature 63 and having its opposite end in abutment with the adjacent end wall of the hood 57. The spring 65 is a relatively light spring which biases the armature toward the electromagnet with sufficient force to overcome any frictional or gravitational effects thereon.

The side plate 53 is formed with an external socket 75 at the inner end of which is insulatably mounted a terminal tip 76. The terminal tip 76 is connected in circuit with one end of the serially connected electromagnet coils 62, as by a conductor 77. The other end of the coils 62 is preferably grounded to the hood 57 as at 78.

The end of the stem 64 projecting from the hood 57 is provided with an upstanding pivot pin 66 to which is pivotally connected one end of a lever 67. The opposite end of the lever 67 is formed with a portion 68 of arcuate transverse cross-section which engages a rounded enlargement 69 on the short arm 70 of the member 46. The lever 67 is also provided with an intermediate portion 71 of arcuate transverse section, the latter portion being positioned in engagement with the rounded peripheral surface (Figure 1) of a cam 72 which is fixed to the lower end of the shaft 27. The cam 72 is provided with a portion 73 of relatively small radius (Figure 2) which portion engages the lever portion 71 at the point "A," said cam also having a portion 74 of substantially larger radius which upon cam rotation engages the lever portion 71 at a point closer to the pivot pin 66, for example at the point "B," for a purpose which will hereinafter appear.

In the form of the invention shown, the electromagnet 60 is powered by a thermoelectric generator 79 which may take the form of a thermocouple. The hot junction of the thermocouple is mounted in a position wherein it is subject to the heat of a pilot burner 80, which burner is positioned adjacent the main burner 15. The pilot burner 80 may be supplied with fuel from any suitable source. The thermocouple 79 is provided with a two conductor lead 81 which is preferably of the concentric type having an outer tubular conductor and an inner conductor insulatably positioned within the outer conductor. The lead 81 may be connected in circuit with the electromagnet coil 62 by a detachable connector means 82 which is threaded into the socket 75 as shown. The connector means 82 is of the type shown in Henry J. Alfery Patent No. 2,276,909, issued March 17, 1942, said connector means connecting the inner lead conductor to the terminal tip 76 and therefore to the ungrounded side of the coils 62. The outer lead conductor is grounded to the valve body by the connector means 82.

The operation of the improved fuel control apparatus will now be described.

When the thermostat 43 is not calling for heat, the circuit of the secondary coil 41 of the electromagnetic operator 19 is open as shown, and the rotor 24 is biased against the stop 24' (Figure 1), the cam 72 being in the position shown. At the same time the valve 17 is biased to closed position by the tension spring 49 and gas pressure, and the armature 63 is biased by the spring 65 into attracted position with respect to the electromagnet 60, as shown. The electromagnet 60 is energized by the current generated by the thermocouple 79 as long as the pilot burner 80 is functioning properly.

Figure 2:
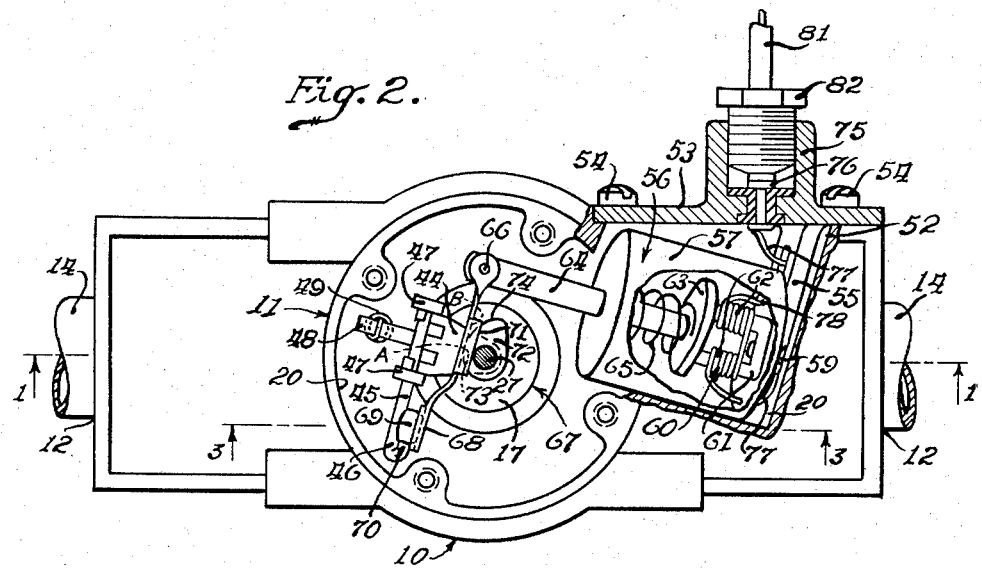
Figure 2 is a fragmental plan view of the improved fuel control device with the electromagnetic operator removed, except for the shaft thereof which is shown in section, parts of the body of said device being broken away.

When the thermostat 43 calls for heat, it closes the circuit of the secondary coil 41 and causes counterclockwise rotation of the rotor 24, shaft 27 and cam 72. During initial rotation of the cam 72 the portion 73 of said cam exerts a relatively high force on the lever 67 at the point "A," urging the lever to the left (Figure 2). Since the electromagnet is energized, it holds the armature 63 in attracted position, and therefore the force of the cam 72 on the lever 67 pivots the latter on the pivot pin 66, causing it to push the arm 70 of the member 46 to the left, thus pivoting the member 46, bracket 44 and the valve 17 on the axis of the arm 45 in a valve opening direction.

As soon as the valve 17 has been cracked open so that the effect of the gas pressure on valve movement is no longer considerable, the portion 74 of the cam 72 engages the lever 67 at the point "B," so that greater valve opening movement per degree of cam rotation is provided. The valve is thus quickly moved to full open position. The electromagnet 60, when energized, exerts a predetermined attractive force on the armature 63. By shaping the cam 72 as shown and described, the resulting leverage successively produces a relatively high initial valve opening force and then relatively rapid valve opening movement while exerting a substantially constant pull-off force on the armature 63 which is preferably slightly less than the attractive force exerted on the armature by the energized electromagnet.

When the thermostat 43 no longer calls for heat, it opens the circuit of the secondary coil 41 and permits the torsion spring 37 to rotate the armature 24, shaft 27 and cam 72 in a clockwise direction to return them to their normal positions shown. As the cam 72 so rotates, the tension spring 49 plus the gas pressure snaps the valve 17 shut and simultaneously keeps the portion 69 of arm 70 in contact with the lever portion 68.

If the pilot burner 80 should fail and permit the thermocouple to cool and deenergize the electromagnet 60, the latter would no longer attract the armature with substantial force. If the valve 17 is being held open when the pilot fails, release of the armature 63 permits the spring 49 and the gas pressure to snap the valve 17 closed, pivoting the lever 67 about the cam in a counter-clockwise direction (Figure 2) and pulling the stem 64 and armature 63 to the left away from the electromagnet. This action provides safety shut-off of the main burner fuel on pilot failure.

If the valve 17 is closed when the pilot fails, and the thermostat 43 subsequently calls for heat, the cam 72 is rotated in a valve opening direction as hereinbefore described. Since the deenergized electromagnet 60 does not attract the armature 63, and since the spring 65 is relatively weak, the spring 49 and gas pressure hold the valve 17 closed and the lever 67 is pivoted about its connection with the portion 69 of the member 46, thus pulling the stem 64 and armature 63 to the left and away from the electromagnet 60.

It is apparent, therefore, that the improved flow control device provides a releasable force transmitting connection between the cam 72 and the valve 17, said connection including a pair of relatively movable members, i. e. the magnet core 61 and the armature 63, provided with latching means in the form of the electromagnet windings 62 which when energized latches the movable members together, and when deenergized permits relative movement of said members to create lost-motion in said connection rendering the latter ineffective to open the valve 17 when the cam is rotated. It will be noted, however, that the cam 72 is free to rotate during pilot outtage, and therefore there is no danger of the operator 19 overheating. Thus, no provision need be made for disconnecting the operator from its source on pilot outtage.

In order to render the released force transmitting connection operative, the pilot burner must be relit so that the thermocouple can reenergize the electromagnet 60. Hence, the valve 17 cannot be opened until after the pilot burner has burned sufficiently long to energize said electromagnet. This provides safe lighting of the pilot burner. Safe lighting is further insured by the fact that in order to render the force transmitting connection operative, not only must the electromagnet be energized, but after energization of the electromagnet the thermostat must be set so that it does not call for heat. Turning down the thermostat opens the circuit of the secondary coil 41 and returns the cam 72 to its normal position shown.

During return movement of the cam, the compression spring 65 moves the stem 64 and armature 63 toward the electromagnet 60 to position the armature against the electromagnet. Thus, if the thermostat is turned down before lighting the pilot burner, the force transmitting connection is rendered operative upon energization of the electromagnet, but since the turned down thermostat doesn't call for heat, the valve 17 remains closed until the thermostat is subsequently turned up. On the other hand, if the thermostat is not turned down before relighting the pilot burner, the valve 17 remains closed because the released force transmitting connection is inoperative to open said valve even though the thermostat may call for heat. In the latter case the valve 17 remains closed until the thermostat is turned down to render the force transmitting connection operative, and is then turned up to cause operation of the operator 19.

It will be noted that no reset mechanism is required in the improved control device since the armature 63 is biased toward and is normally in engagement with the electromagnet 60.

The illustrated forms of the invention were selected for the purpose of disclosure only and are not intended to define the limits or scope of the invention. Various changes and modifications may be made without departing from the spirit of the invention, and all of such changes are contemplated as may come within the scope of the claims.

What is claimed as the invention is:

1. In combination: a control member biased toward a first position and movable to a second position; a lever; a pivotal mounting for said lever releasable in response to forces thereon above a predetermined amount, said lever being connected to said control member to cause movement of the latter toward its second position on pivotal movement of said lever in one direction; and a cam adapted to be rotated by a source of power and having a first surface portion engageable with said lever to pivot the latter and cause initial movement of the control member, said cam having a second surface portion engageable with said lever after said initial movement, said second cam surface portion engaging said lever at a predetermined point closer to said pivot than said first cam surface portion, thereby creating greater movement of the control member per degree of cam rotation after said initial movement, the point of engagement of said first cam surface portion with said lever being so positioned that the forces exerted by said lever on the pivotal mounting during said initial movement are substantially equal to said predetermined amount, the point of engagement of said second cam surface with said lever being so positioned that the forces exerted by said lever on said pivotal mounting during subsequent movement of the control member after said initial movement are also substantially equal to said predetermined amount, whereby rotation of said cam successively produces relatively high initial forces on and relatively rapid continuing movement of the control member without releasing the pivotal mounting of said lever.

2. In combination: a valve member movable from a closed to an open position against fluid pressure; a normally energized stationary electromagnet; an armature coacting with said electromagnet and normally held in attracted relationship therewith, said armature being releasable from the energized electromagnet in response to pull-off forces above a predetermined amount; a lever pivotally connected to said armature and to said valve to cause opening movement of the latter on pivotal movement of said lever in one direction about its pivotal connection to said armature; and a cam adapted to be rotated by a source of power and having a first surface portion engageable with said lever to pivot the latter in a valve opening direction to cause initial cracking of the valve, said cam having a second surface portion engageable with said lever after the valve has been cracked, said second surface portion engaging said lever at a predetermined point closer to its armature connection than said first surface portion, thereby creating greater valve movement per degree of cam rotation after cracking of the valve when the resistance of said valve to movement is lowered, the point of engagement of said first cam surface portion with said lever being so positioned that the pull-off forces exerted by said lever on the armature during cracking of the valve are substantially equal to said predetermined amount, the point of engagement of said second cam surface with said lever being so positioned that the pull-off forces exerted by said lever on said armature during valve movement after cracking are also substantially equal to said predetermined amount, whereby rotation of said cam successively produces relatively high valve opening force and relatively rapid valve opening movement without releasing the armature from the energized electromagnet.

References Cited in the file of this patent
UNITED STATES PATENTS

| | | |
|---|---|---|
| Re. 21,977 | Hotchkiss | Dec. 16, 1941 |
| 1,678,658 | Thomas | July 31, 1928 |
| 2,227,447 | Fisher | Jan. 7, 1941 |
| 2,254,069 | Harris | Aug. 26, 1941 |
| 2,288,890 | Denison | July 7, 1942 |
| 2,298,825 | Grant | Oct. 13, 1942 |
| 2,299,286 | Wantz | Oct. 20, 1942 |
| 2,303,128 | Koppel | Nov. 24, 1942 |
| 2,591,897 | Weber | Apr. 8, 1952 |
| 2,607,530 | Eskin | Aug. 19, 1952 |
| 2,607,531 | Eskin | Aug. 19, 1952 |
| 2,684,074 | Kutzler et al. | July 20, 1954 |